United States Patent [19]
Posingies

[11] 3,780,769
[45] Dec. 25, 1973

[54] FLUIDIC VARIABLE CAPACITANCE NETWORK

[75] Inventor: Walter M. Posingies, Minneapolis, Minn.

[73] Assignee: Honeywell Inc., Minneapolis, Minn.

[22] Filed: Dec. 17, 1971

[21] Appl. No.: 209,299

[52] U.S. Cl. ..................... 137/819, 137/829, 92/40
[51] Int. Cl. ............................................. F15c 3/00
[58] Field of Search ..................... 137/81.5, 86, 819, 137/829; 92/40

[56] References Cited
UNITED STATES PATENTS

| | | | |
|---|---|---|---|
| 2,896,655 | 7/1959 | Hartz | 137/86 |
| 2,949,922 | 8/1960 | Grogan | 137/86 |
| 3,404,701 | 10/1968 | Shiiki | 137/81.5 |

*Primary Examiner*—William R. Cline
*Attorney*—Charles J. Ungemach et al.

[57] ABSTRACT

A fluidic variable capacitance network comprising a pair of bellows having non-linear pressure-displacement characteristics enclosed in pressurized enclosures, and an adjustable biasing network for controlling the operating point of the bellows. The capacitance of the bellows with respect to an AC pressure signal is a function of the nominal operating point of the bellows established by the biasing network. Also disclosed is a scheduled variable high pass fluid amplifier utilizing the variable capacitance network.

4 Claims, 4 Drawing Figures

FLUIDIC VARIABLE CAPACITANCE NETWORK

BACKGROUND OF THE INVENTION

This invention relates generally to fluidic control circuits, and more particularly to variable capacitance circuits therefor.

Control circuits using fluid amplifiers and other no moving part fluidic devices have been used in a wide variety of applications. In some of these applications it has been found desirable to use a high pass network so that high frequency signals may be passed while low frequency signals may be attenuated or blocked. For example, in a fluidic flight control system or stability augmentation system for an aircraft, it is often necessary to use a high pass network in order to obtain a desired control function.

A very useful high pass network has been obtained by placing a series connected bellows assembly in the control line. It is known that such an arrangement operates in a manner analogous to a series capacitance in an electrical circuit, and that high frequency signals above the break frequency are passed freely, while signals below the break frequency are attenuated greatly or are completely blocked. In order to change the break frequency in the prior art circuit just described, it is necessary to replace the bellows assembly with one having different physical characteristics and therefore a higher or lower capacitance, as required.

However, the present invention provides a bellows assembly and biasing network for use in a fluidic high pass circuit, wherein the capacitance, and hence the break frequency, may be controlled by adjusting the biasing network. Further, suitable apparatus can be provided for scheduling the bias network as a function of a desired quantity. For example, in the case of an aircraft flight control system, it may be desirable to schedule the break frequency as a function of air speed or altitude.

SUMMARY OF THE INVENTION

The present invention provides a fluid capacitance circuit for transmitting fluid signals, which includes a bellows having non-linear pressure-displacement characteristics and an adjustable bias network. The bellows is placed inside a sealed enclosure, and part of the biasing network is connected to the enclosure external to the bellows, and another part of the biasing network is connected to the enclosure internal to the bellows. The enclosure also contains a pair of signal ports respectively interior and exterior to the bellows. Adjustable means is provided in the biasing network for controlling the nominal operating point of the bellows, so as to control the capacitance of the bellows with respect to AC fluidic signals transmitted through the signal ports.

DESCRIPTION OF THE PREFERRED EMBODIMENT

Figure 1:
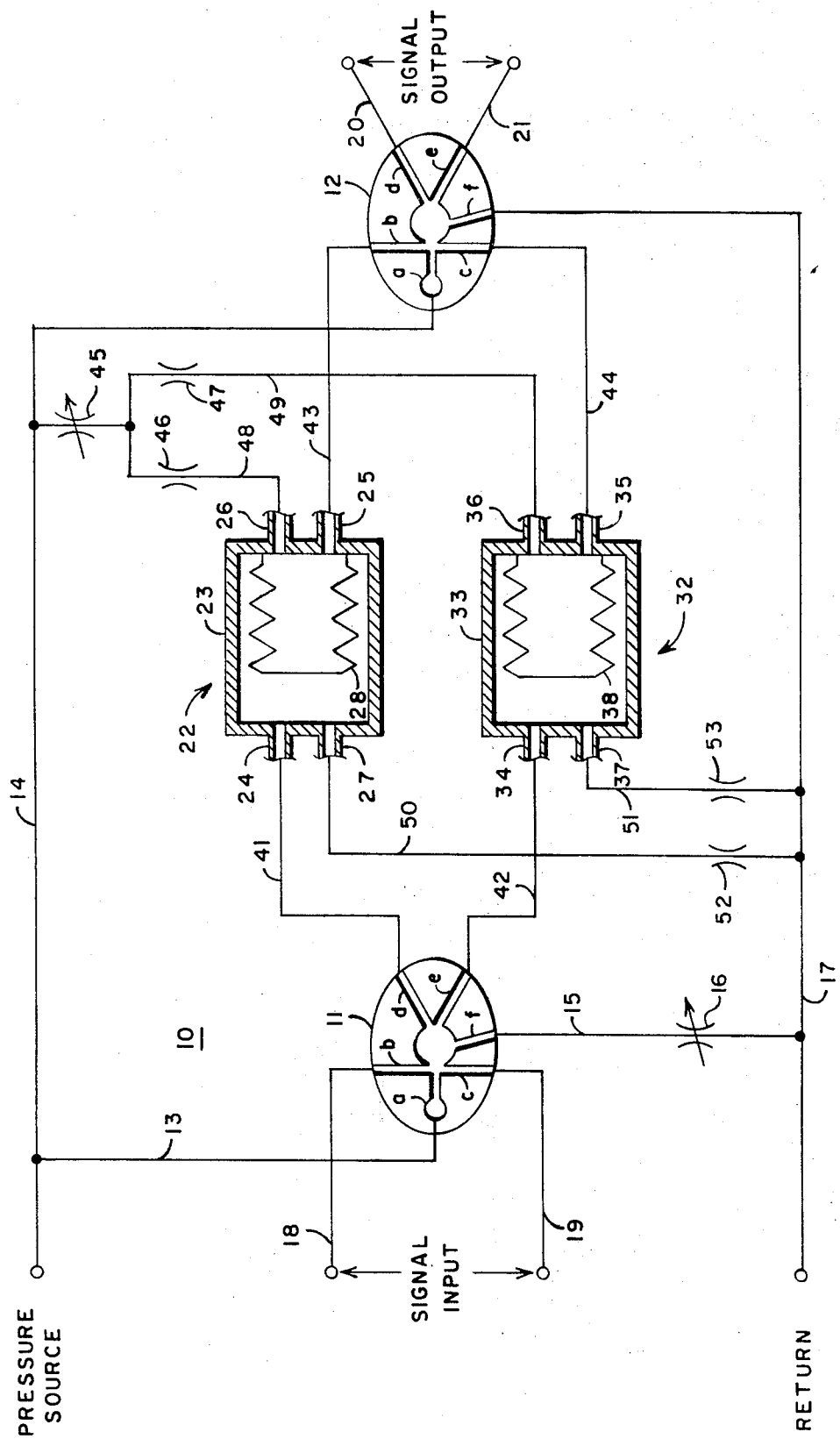
FIG. 1 is a schematic drawing of a fluidic variable high pass amplifier circuit according to the present invention.

In FIG. 1 reference numeral 10 generally designates a fluidic variable high pass amplifier which utilizes the present invention. In amplifier circuit 10 there is a pair of proportional fluid amplifiers 11 and 12. Each amplifier has a power nozzle $a$, a pair of control ports $b$ and $c$, a pair of outlet passages $d$ and $e$ and a vent $f$. A source of fluid under pressure is connected to power nozzle $11a$ by a conduit 13, to a power nozzle $12a$ through a conduit 14. Since the operation of this circuit depends upon the use of a fluid having relatively incompressible flow characteristics, the fluid source is preferably a source of a liquid under pressure. Excess fluid from vent $11f$ is connected to a fluid return line through a conduit 15, a variable fluid resistor 16, and a return conduit 17. Similarly, vent $12f$ is connected to the fluid return through conduit 17. A pair of conduits 18 and 19 connect respectively to control ports $11b$ and $11c$ to serve as the signal input for the circuit. A pair of conduits 20 and 21 which are connected to outlet passages $12d$ and $12e$ provide the signal output for the circuit.

A pair of bellows assemblies 22 and 32 provide coupling between amplifiers 11 and 12 and also perform the high pass function of the circuit. Bellows assembly 22 comprises a housing 23 which is sealed except for ports 24–27. Inside housing 23 is a flexible bellows 28, which is attached to one wall of the housing. As shown, ports 25 and 26 connect to the interior of bellows 28, while ports 24 and 27 connect to the inside of housing 23 exterior to the bellows. Bellows assembly 32 is identical to bellows assembly 22, and comprises a housing 33, a bellows 38, and ports 34–37. Ports 24, 25, 34 and 35 are signal ports for receiving AC signals. A pair of conduits 41 and 42 connect outlet passages $11d$ and $11e$ to signal ports 24 and 34 of bellows assemblies 22 and 32, respectively. Similarly, a pair of conduits 43 and 44 connect signal ports 25 and 35 to control ports $12b$ and $12c$ respectively. Biasing pressure is applied to the bellows from conduit 14 through a variable resistor 45, a pair of fixed resistors 46 and 47, and a pair of conduits 48 and 49 which connect respectively to ports 26 and 36. A conduit 50 connects port 27 through resistor 52 to return line 17. Likewise, a conduit 51 connects port 37 through a resistor 53 to return line 17.

According to the present invention, bellows 28 and 38 are chosen to have a desired non-linear pressure-displacement characteristic, as is more fully described in a subsequent paragraph. It is these non-linear bellows together with the variable resistors 16 and 45 and associated circuitry that perform the variable high pass function which is the object of this invention.

However, in order that the unique features of the present invention may be more readily understood, the operation of a prior art non-variable high pass circuit will be described. Such a prior art circuit may be visualized with the aid of FIG. 1, if it is assumed that bellows 28 and 38 are standard linear bellows, and also if the variable resistors 16 and 45 are disregarded. DC biasing for the circuit is provided as follows: assuming for the moment that no signal is applied to conduits 18 and 19, the fluid applied to amplifier 11 via conduit 13 and power nozzle $11a$ passes through the amplifier and exits through outlet passage $11d$ and $11e$ and vent $11f$, with equal amounts going to outlet passages $11d$ and $11e$.

Fluid drawn off through vent 11f goes to the fluid return line via conduits 15 and 17. Fluid passing through the outlet passages is conveyed to the insides of housings 23 and 33 external to bellows 28 and 38 via conduits 41 and 42 and ports 24 and 34. This fluid connects to the return line 17 through ports 27 and 37, conduits 50 and 51, and resistors 52 and 53. The purpose of resistors 52 and 53 is to maintain the biasing pressure inside housings 23 and 33. Biasing pressure is supplied to the interior of bellows 28 and 38 from the pressure source by conduit 14, resistors 46 and 47, conduits 48 and 49, and ports 26 and 36. Fluid exits bellows through ports 25 and 35, conduits 43 and 44, and control ports 12b and 12c. Control ports 12b and 12c have a smaller cross sectional area than conduits 43 and 44 and therefore serve as resistors so as to maintain pressure inside bellows 26 and 36. In the absence of AC signals, the biasing flow just described is the same for both control ports 12b and 12c, so there is no deflection of the power stream passing through amplifier 12 from power nozzle 12a, since deflection in a proportional fluid amplifier results only from differential pressures applied to the control ports.

The pressures interior and exterior to bellows 28 and 38 are fixed by the choice of resistors 46, 47, 52 and 53. Usually these are selected to give the bellows a slight extension. If AC pressure signals are now applied to the signal input at conduits 18 and 19, they will be amplified by amplifier 11 and superimposed upon the DC biasing flow through outlet passages 11d and 11e. The amplified AC pressure signals are conveyed through conduits 41 and 42, and signal ports 24 and 34, to the interior of enclosures 23 and 33. The high frequency components of the AC signals propagate through the flexible bellows and pass out signal ports 25 and 35, superimposed upon the biasing flow previously discussed. The AC signals are conveyed by conduits 43 and 44 to control ports 12b and 12c of amplifier 12, where they are amplified and appear on conduits 20 and 21 at the signal output. The low frequency components of the AC signal are ineffective to propagate through the bellows assemblies, and therefore are attenuated or blocked.

It is known that if the bellows used in the prior art circuit are very flexible, that is, if they have a low spring constant, then the break frequency will be lower than if the bellows employed have a high spring constant. Therefore, in the prior art circuits the desired break frequency for a particular circuit is achieved by selecting bellows which have the necessary flexibility or stiffness. However, once bellows are installed in the prior art circuit, the break frequency cannot be altered without replacing bellows assemblies.

For many applications, particularly those in which a fluid pressure is converted to a mechanical displacement or vice versa, it is desirable that bellows have a very linear pressure-displacement characteristic. Consequently much effort has gone into designing and building linear bellows. However, the unique features of the present invention are obtained as a result of the deliberate use of non-linear bellows, together with an adjustable biasing network. It is well known that the linearity of the bellows is a function of many factors including the type and heat treatment of the materials used, and the shape of the individual elements. It is therefore possible to design a bellows having the desired non-linear characteristics. Alternatively, it is possible to use a suitable non-linear spring in conjunction with a bellows to obtain the desired characteristic.

Figure 2:
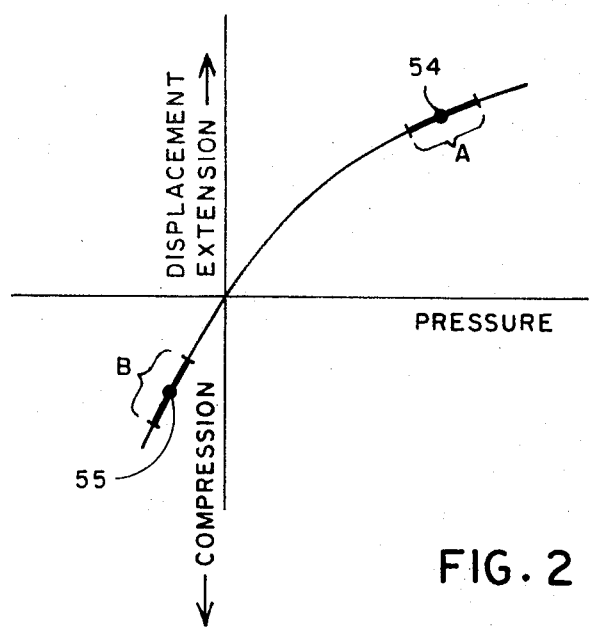
FIG. 2 is a graph showing the bellows pressure-displacement characteristics for the bellows used in the embodiment of FIG. 1.

In FIG. 2 there is shown a graph of a bellows having non-linear pressure-displacement characteristics suitable for use in the circuit of FIG. 1 according to the present invention. In FIG. 2, the horizontal axis represents the pressure difference applied to the bellows, and the vertical axis represents the displacement, either extension or compression, of the bellows in response to the applied pressure. The non-linear characteristic is readily apparent from the fact that the curve does not have a constant slope. For example, in region A the slope of the curve is relatively shallow, indicating that relatively little displacement results from a given pressure increment. In contrast, in region B the slope is steeper, indicating that a larger displacement results from the same increment of pressure. In other words, the bellows has greater stiffness in region A, while it has more flexibility in region B.

Referring again to FIG. 1, the variable capacitance, variable high pass feature of the present invention will now be explained. Assuming that bellows 28 and 38 have non-linear characteristics as shown in FIG. 2, variable resistors 45 and 16 operate in conjunction with the rest of the biasing network to vary the operating point of the bellows. For example, as the resistance of variable resistor 45 is reduced, the pressure inside bellows 28 and 38 is increased causing the bellows to expand. Accordingly, the bias point or operating point of the bellows moves along the curve of FIG. 2 toward region A. Conversely, if the resistance of variable resistor 45 is increased, the pressure in bellows 28 and 38 is decreased, causing the bellows to retract away from region A and toward region B. Variable resistor 16 may also be used to vary the operating point of the bellows. If the resistance of variable resistor 16 is decreased, a greater amount of fluid will be drawn through vent 11f to the return line 17, resulting in a lessened DC flow through conduits 41 and 42 to the interiors of enclosures 23 and 33. This in turn results in a lowering of pressure external to the bellows which causes the bellows to expand towards region A. Conversely, if the resistance of variable resistor 16 is increased, less of the total flow through amplifier 11 is drawn off through vent 11f, and more passes through outlet passages 11d and 11e as DC biasing pressure. Accordingly, greater biasing pressure is built up within enclosures 23 and 33 external to the bellows, compressing the bellows away from region A and toward region B. It should be pointed out that the necessary biasing adjustments can be made by using either variable resistor 16 or variable resistor 45 singly, or by using both together. It should also be noted that the biasing can be adjusted to place the operating point of the bellows anywhere on the curve of FIG. 2, and that regions A and B are shown only for illustrative purposes.

Assuming that a high pass filter having a relatively high break frequency is desired, the operating point of bellows 28 and 38 of FIG. 1 can be adjusted to region A of FIG. 2 by either decreasing the resistance of variable resistor 45 or decreasing the resistance of variable resistor 16, or both. With the bellows adjusted for nominal operation at point 54 of FIG. 2, AC signals applied to the circuit of FIG. 1 will cause an instantaneous displacement of the bellows throughout region A. With the bellows biased to the relatively stiff region A, the performance of the circuit of FIG. 1 is shown by curve 56A of FIG. 3, in which the horizontal axis represents frequency and the vertical axis represents the gain of the circuit. For frequencies higher than $F_A$, the gain is constant at a value determined by the amplification of amplifiers 11 and 12. Below $F_A$, the break frequency, the gain of the circuit is increasingly attenuated for lower frequencies until it eventually becomes negligible.

Figure 3:
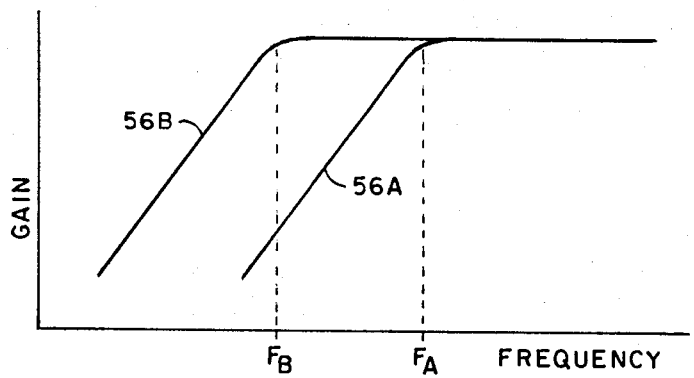
FIG. 3 is a graph illustrating the performance of the circuit of FIG. 1.

If the operating point of bellows 28 and 38 is now changed from point 54 to point 55 of FIG. 2, by increasing the resistance of either variable resistor 16 or variable resistor 45, or both, the performance of the circuit of FIG. 1 will be changed to curve 56B of FIG. 3. Because the bellows when operating in region B of FIG. 2 have greater flexibility, the low frequency response of the circuit is extended so that the break occurs at $F_B$. Thus, by altering the nominal operating point of the bellows assemblies by means of the adjustable biasing network, the break frequency of the high pass circuit of FIG. 1 can be controlled as desired, over the total operating range of the non-linear bellows.

Figure 4:
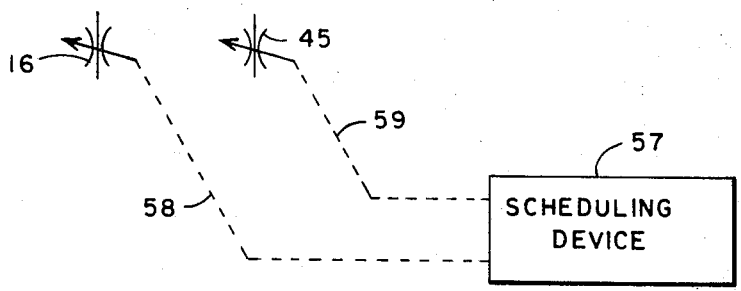
FIG. 4 illustrates a scheduling device which may be used in conjunction with the circuit of FIG. 1.

In FIG. 4 there is schematically indicated a scheduling device 57 which is connected through suitable mechanical linkages 58 and 59 to adjust variable resistors 16 and 45, which are the variable resistors in the circuit of FIG. 1, previously discussed. Scheduling device 57 may be a device responsive to any parameter as desired to adjust the capacitance of the bellows assemblies and hence the frequency response of the high pass circuit of FIG. 1. For example, for use in a fluidic aircraft control system, scheduling device 57 may be an airspeed responsive or an altitude responsive device, and the high pass circuit of FIG. 1 may be a subcircuit in the fluidic control system. The altitude or airspeed responsive device is connected to adjust the frequency response to the high pass filter in a predetermined manner so as to attain desired performance characteristics.

I claim as my invention:

1. Apparatus of the class described comprising, in combination:
   a source of pressure;
   a fluidic amplifier having a supply port connected to the source of pressure, having a control input port and an output port;
   a bellows assembly having a non-linear bellows dividing said assembly into first and second chambers, the first and second chambers each having first and second ports, the first port of said first chamber being connected to the output port of the fluidic amplifier;
   a variable fluid resistance circuit connected between the first port of the second chamber and the pressure source, fluid from the pressure source passing through the variable resistance network, entering the second chamber through the first port thereof, exerting a pressure force on said non-linear bellows and passing out the second port of the second chamber;
   output means connected to the second port of said second chamber to receive the fluid therefrom;
   and means connected to the control port of the fluidic amplifier to produce an input signal operable within said fluidic amplifier to produce an output signal through the output port thereof which output signal passes through the first and second ports of the first chamber of said bellows assembly and exerts a pressure force on said non-linear bellows, said non-linear bellows being movable in response to such output signal to produce a signal at the second port of the second chamber of said bellows assembly and thus provide an input signal for the output means, adjustment of said variable fluid resistance circuit varying the pressure force on said non-linear bellows to adjust the operating point thereof.

2. In a fluid circuit having a bellows assembly including a movable bellows dividing the assembly into first and second chambers, the first and second chambers each having an input port and an output port, biasing means connected to the assembly to position the movable bellows to a normal operating position, input means connected to the input port of the first chamber for producing an input signal at least a portion of which is transmitted from the input port of the first chamber through the first chamber, across the movable bellows, through the second chamber to the output port of the second chamber, and output means connected to the output port of the second chamber to receive the transmitted signal, the improvement comprising:
   the movable bellows being non-linear and the biasing means being adjustable so as to change the normal operating position of the movable bellows.

3. Apparatus according to claim 2 wherein said biasing means includes a variable fluid resistor and wherein said input means and said output means include fluidic amplifiers.

4. Apparatus according to claim 3 further including scheduling means responsive to a control parameter and connected to said biasing means, said scheduling means operable to adjust said biasing means in response to changes in the control parameter so as to change the normal operating position of the movable bellows as a function of the control parameter.

* * * * *